UNITED STATES PATENT OFFICE.

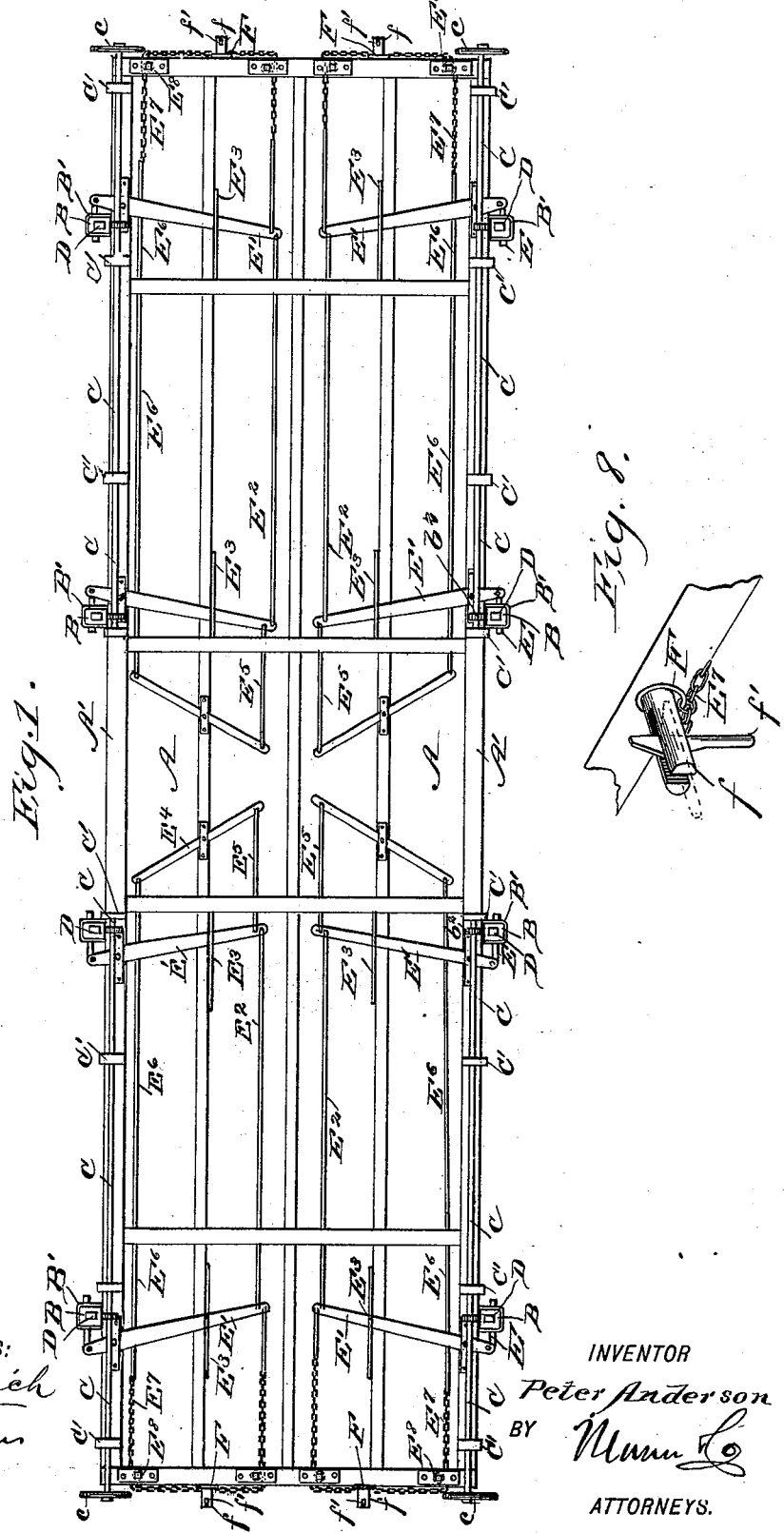

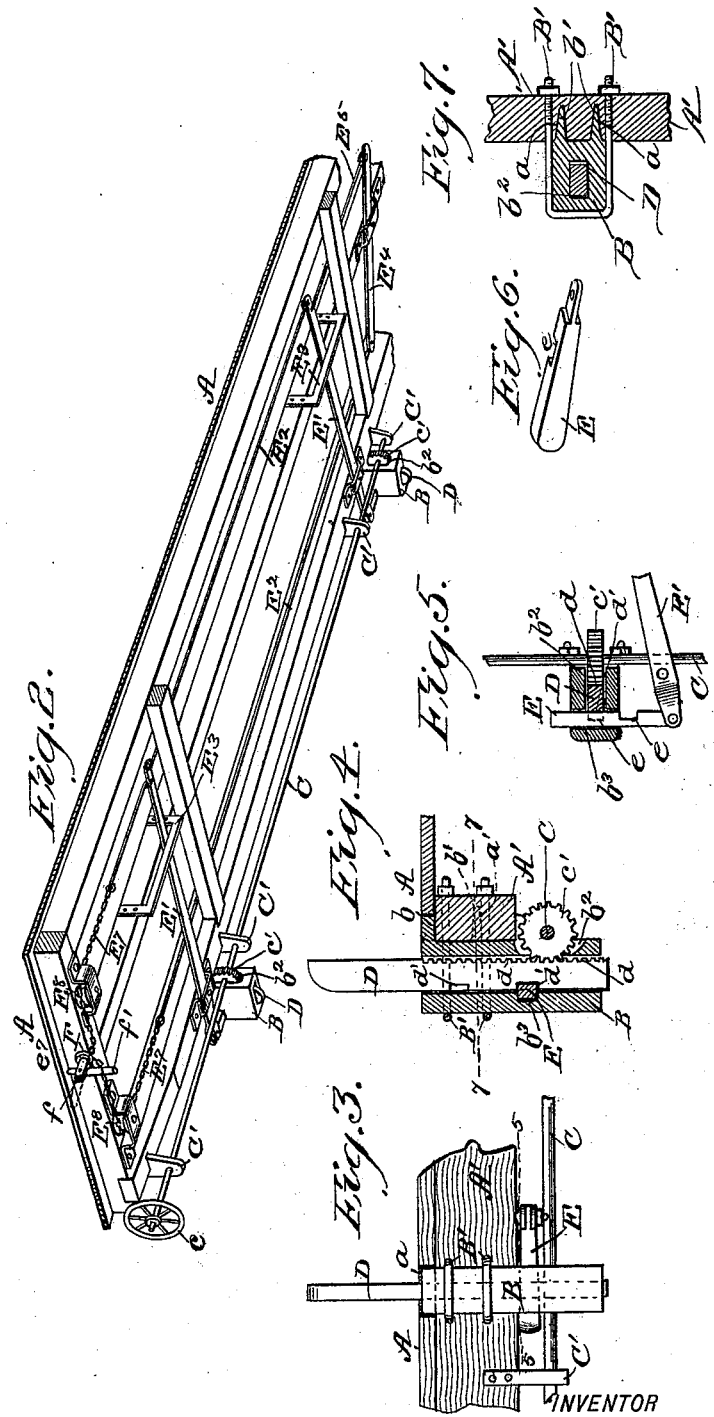

PETER ANDERSON, OF PRENTICE, WISCONSIN.

CAR-STAKE.

SPECIFICATION forming part of Letters Patent No. 511,575, dated December 26, 1893.

Application filed May 27, 1893. Serial No. 475,811. (No model.)

*To all whom it may concern:*

Be it known that I, PETER ANDERSON, a subject of the King of Sweden and Norway, residing at Prentice, in the county of Price and State of Wisconsin, have invented certain new and useful Improvements in Car-Stakes, of which the following is a full, clear, and exact specification, reference being had to the accompanying drawings, forming part thereof, and in which—

Figure 1 is a bottom plan view of a car arranged according to my invention. Fig. 2 is a perspective view of a portion of a car. Fig. 3 is a detail side view of the stake and socket. Fig. 4 is a vertical section of the same. Fig. 5 is a horizontal section on line 5—5 Fig. 3. Fig. 6 is a perspective view of the locking bolt. Fig. 7 is a horizontal section on line 7—7 Fig. 4. Fig. 8 is a detail view hereinafter referred to.

The object of the invention is to provide an improved car stake and operating mechanism therefor whereby the stake may be lowered to the level of the car floor and raised into operative position again and there locked.

The invention therefore consists in the construction and arrangement of a stake-socket and stake, and the means for operating, locking and releasing the latter, as hereinafter described.

A represents the body or platform of an ordinary gondola or platform car provided on each quarter with a set of my improved stakes and their operating mechanisms. The sides of the platform or car are each provided with four vertical sockets B secured by the ∩-shaped bolts or clips B' and the inner side of the upper end of each socket is provided with a lateral supporting flange $b$ which enters a recess $a$ in the platform and rests upon the upper edge of the side beam A' thereof. In addition to this flange $b$ the inner faces of the sockets are each provided with dowel pins or studs $b'$ which enter corresponding recesses $a'$ in the outer face of the side beams A'. Thus when the clips B' are drawn inwardly by their nuts the sockets will be firmly clamped to the platform of the car or other vehicle and the flange $b$ and dowels or studs $b'$ will materially assist in holding the same securely in place. The inner face of the stake sockets B are provided with vertical slots $b^2$ which intersect the socket opening and the said sockets are further provided with transverse bolt openings $b^3$ between their ends and intersecting the socket openings in their outer walls for purposes to be presently described.

At the sides of the platform are four longitudinally extending shafts C mounted in hangers C' and provided at the four corners of the car with operating hand wheels $c$. These shafts C each extend past the inner slotted portion of one pair of stake sockets B and are each provided with two fixedly secured pinions $c'$ which project through the slots $b^2$; each shaft being capable of independent operation.

Into and through each stake socket B extends a stake D provided on its inner edge with teeth $d$ engaged by said pinions $c'$ so that each pair of stakes may be raised to any desired height and lowered to or below the level of the platform.

In order to relieve the pinions of strain I provide locking mechanisms for the several pairs of stakes said mechanisms each comprising a bolt E extending through the openings $b^3$ in the stake sockets B and engaging any one of a plurality of transverse notches $d'$ in the outer vertical edge of the stake D. Each of these bolts E is provided with a transverse notch $e$ across its inner edge, of the same width as the outer edge of the stake so that when the notch $e$ registers with the stake the latter is unlocked and free to be raised and lowered by its operating mechanism.

The bolts E are operated in pairs by means of lever mechanisms each of such mechanims comprising two levers E' pivoted near their outer ends to the beams A' adjacent to the sockets and pivotally connected at their outer ends to the bolts. The inner ends of each pair of levers E' are connected by a rod or other suitable connection E² and pass through suitable guide loops or brackets E³. Beyond the inner lever E' of each pair is a centrally pivoted lever E⁴ connected at the inner end by a short rod E⁵ with the inner end of the adjacent lever E' and from the outer end of each lever E⁴ a longitudinal rod E⁶ extends toward the end of the car or platform. A chain E⁷ connects the outer end of each rod E⁶ with the inner end of the outermost lever E' of each pair; each chain E⁷ passing around a pair of pulleys E⁸ on the under side of the platform at the end thereof. Between each pair of pulleys on the end of the car is a locking latch F comprising an attaching post $f$ having a slotted outer end and a gravity locking arm $f'$ pivoted nearer its upper end in the slotted end of post $f$ and adapted to be swung into the longitudinal plane of the post to allow a ring $e^7$ on the chain E⁷ to pass onto the post after which the locking arm is released and swings into a vertical position as shown in Fig. 8 which prevents displacement of the ring and locks the lever mechanism of the stake bolts E as shown in Fig. 2. The outer ends of the bolts E are enlarged so that they cannot be drawn entirely through their openings $b^2$ in the stake sockets B.

The platform will be loaded with logs of about half its length one pile of logs being held between the two pairs of stakes at one end of the car and the other pile between the other two pairs. Thus to unload it is simply necessary for the operator to stand at the end of the car and unlock one pair of stakes B at the side from which the load is to be removed and then turn the hand wheel to lower the stakes B whereupon that pile of logs will roll off of the platform without endangering the operator's life or limbs. The operator then steps to the other end of the car and similarly operates the other set of stake mechanism at the same side of the car.

Having thus described my invention, what I claim is—

1. The combination, with a platform car, a stake-socket attached thereto, and a stake which is adjustable in the socket and provided with rack teeth, of a pinion which engages the stake, and a shaft having a hand wheel fixed thereon, as shown and described, to operate as specified.

2. The combination, with the stake-socket and a stake slidable therein and having a transverse notch in its outer side, of the slidable and notched locking bar, E, arranged transversely in the socket, as shown and described.

3. The combination with a stake socket a sliding stake therein and a rack and pinion mechanism for raising and lowering the stake, of a bolt mechanism for locking the stake against sliding, substantially as set forth.

4. The combination with a pair of stake sockets and a vertically adjustable stake in each socket, of a shaft and gearing connecting said stakes for simultaneous operation substantially as set forth.

5. The combination with a pair of stake sockets and a vertically adjustable stake in each socket of a shaft and gearing connecting said stakes for simultaneous operation and a bolt mechanism for each stake and connection between said bolt mechanisms substantially as set forth.

6. The combination with a pair of stake sockets and a vertically adjustable stake in each socket, of a shaft and rack and pinion mechanism connecting said stakes for simultaneous operation, bolts mounted in the stake sockets to lock and release the stakes, connected levers pivotally connected with said bolts, a chain for operating the lever mechanism to throw and retract the bolts, and a locking device to lock the chain and prevent the lever mechanism from being actuated to release the bolts substantially as set forth.

7. The combination with the car stakes and their locking bolts, of a lever mechanism for throwing and retracting the bolts a chain for operating the said lever mechanism and provided with a ring, and a pivoted gravity locking arm over which the ring may be passed and locked substantially as set forth.

8. The combination with stakes, the bolts, the operating mechanism therefor and the operating chain for the lever mechanism provided with a ring, of the slotted post, and the gravity locking arm pivoted near its upper end in said slot and adapted to swing into the longitudinal plane of the post to permit the passage of the ring and then fall at right angles to the post and lock the ring thereon.

9. The combination with the platform of a car or other vehicle, of four sets of stake mechanisms mounted on the four quarters of the car each mechanism being adapted to be independently operated from the end of the car and each set comprising a pair of stake sockets, a pair of stakes, a rack and pinion mechanism for simultaneously raising and lowering each pair of stakes independently of the others, and a separate locking mechanism for each pair of stakes substantially as set forth.

10. A car stake socket B formed with a lateral flange $b$ dowels or studs $b'$, slot $b^2$ and bolt apertures $b^3$ substantially as set forth.

11. A car stake D provided with a toothed inner edge $d$ and a notched outer edge $d'$ substantially as set forth.

12. The combination with a pair of sockets B B the vertically sliding stakes D D, having toothed inner edges and notched outer edges, the shaft provided with pinions engaging said teeth and the notched bolts engaging said notched stake edges, of the two levers E' E' pivoted near their outer ends to the platform and pivoted at their outer extremities to the respective bolts, the inner ends of said levers being connected, a centrally pivoted lever E⁴, connected at its inner end with the inner end of the innermost lever E', guide pulleys E⁸ on the end of the platform, a chain E⁷ passing around said pulleys and connected with the outer end of lever E⁴ and the inner end of the outer lever E', a ring $e^7$ on said chain and a locking latch for the ring between the said two pulleys substantially as set forth.

PETER ANDERSON.

Witnesses:
DAVE A. MYLERS,
M. R. ODEGUARD.